(12) United States Patent
Zhevelev et al.

(10) Patent No.: US 7,875,852 B2
(45) Date of Patent: Jan. 25, 2011

(54) PASSIVE INFRARED DETECTORS

(75) Inventors: Boris Zhevelev, Rishon le Zion (IL); Yaacov Kotlicki, Ramat Gan (IL)

(73) Assignee: Visonic Ltd, Tel Aviv (IL)

( * ) Notice: Subject to any disclaimer, the term of this patent is extended or adjusted under 35 U.S.C. 154(b) by 89 days.

(21) Appl. No.: 12/227,274

(22) PCT Filed: Jul. 26, 2007

(86) PCT No.: PCT/IL2007/000939
§ 371 (c)(1),
(2), (4) Date: Jan. 23, 2009

(87) PCT Pub. No.: WO2008/012823
PCT Pub. Date: Jan. 31, 2008

(65) Prior Publication Data
US 2009/0302222 A1    Dec. 10, 2009

Related U.S. Application Data

(60) Provisional application No. 60/834,367, filed on Jul. 27, 2006.

(51) Int. Cl.
*G01J 5/08* (2006.01)
(52) U.S. Cl. ......................... 250/332; 250/353
(58) Field of Classification Search .................. 250/332, 250/339.12, 352, 353, DIG. 1
See application file for complete search history.

(56) References Cited

U.S. PATENT DOCUMENTS 3,524,180 A    8/1970  Crouse
3,949,259 A    4/1976  Kostlin et al.
3,958,118 A    5/1976  Schwarz (Continued)

FOREIGN PATENT DOCUMENTS

EP    0481934    4/1992

(Continued)

OTHER PUBLICATIONS

An Examination Report dated Sep. 6, 2010, which issued during the prosecution of Applicant's UK Patent Application No. 1010004.8.

(Continued)

*Primary Examiner*—David P Porta
*Assistant Examiner*—Mark R Gaworecki
(74) *Attorney, Agent, or Firm*—Husch Blackwell Welsh Katz

(57) ABSTRACT

A passive infrared detector assembly including a detector housing comprising a window transparent to far infrared radiation, at least one sensor sensitive to the far infrared radiation and disposed within the detector housing and an anti-masking subassembly, including at least one light guide having a serrated light aperture, the light aperture defining a plurality of teeth like portions and a plurality of grooves and being disposed close to the outside of the window, at least one infrared light emitter operative to emit near infrared radiation via the light aperture of the at least one light guide and a near infrared radiation receiver operative to receive radiation emitted by the at least one near infrared light emitter and to measure the level of received near infrared radiation and to provide a masking alarm signal upon detection of a predetermined change in the level of the received near infrared radiation.

16 Claims, 2 Drawing Sheets

U.S. PATENT DOCUMENTS

| | | |
|---|---|---|
| 4,048,980 A | 9/1977 | Googin et al. |
| 4,055,707 A | 10/1977 | McDonald |
| 4,058,726 A | 11/1977 | Paschedag et al. |
| 4,081,680 A | 3/1978 | Keller |
| 4,087,688 A | 5/1978 | Keller |
| 4,199,218 A | 4/1980 | Steinhage |
| 4,225,786 A | 9/1980 | Perlman |
| 4,242,669 A | 12/1980 | Crick |
| 4,245,217 A | 1/1981 | Steinhage |
| 4,271,359 A | 6/1981 | Herwig et al. |
| 4,321,594 A | 3/1982 | Galvin et al. |
| 4,342,987 A | 8/1982 | Rossin |
| 4,375,034 A | 2/1983 | Guscott |
| 4,429,224 A | 1/1984 | Wagli et al. |
| 4,431,708 A | 2/1984 | Carver et al. |
| 4,479,056 A | 10/1984 | Zierhut |
| 4,594,995 A | 6/1986 | Garrison |
| 4,604,524 A | 8/1986 | Kotlilcki et al. |
| 4,614,938 A | 9/1986 | Weitman |
| 4,645,930 A | 2/1987 | Zierhut |
| 4,704,533 A | 11/1987 | Rose et al. |
| 4,709,152 A | 11/1987 | Muller et al. |
| 4,709,153 A | 11/1987 | Schofield |
| 4,746,910 A | 5/1988 | Pfister et al. |
| 4,751,396 A | 6/1988 | Daigle et al. |
| 4,752,768 A | 6/1988 | Steers et al. |
| 4,772,875 A | 9/1988 | Maddox et al. |
| 4,787,722 A | 11/1988 | Claytor |
| 4,912,748 A | 3/1990 | Horii et al. |
| 4,914,283 A | 4/1990 | Brinckmann et al. |
| 4,943,800 A | 7/1990 | Ikeda et al. |
| 4,982,094 A | 1/1991 | Matsuda |
| 5,077,549 A | 12/1991 | Hershkovitz et al. |
| 5,268,680 A | 12/1993 | Zantos |
| 5,296,707 A | 3/1994 | Nozu |
| 5,424,718 A | 6/1995 | Muller et al. |
| 5,465,080 A | 11/1995 | Liddiard et al. |
| 5,475,367 A | 12/1995 | Prevost |
| 5,559,496 A | 9/1996 | Dubats |
| 5,570,079 A | 10/1996 | Dockery |
| 5,572,033 A | 11/1996 | Grant |
| 5,608,220 A | 3/1997 | Wieser et al. |
| RE35,534 E | 6/1997 | Claytor |
| 5,693,943 A | 12/1997 | Chernihovski et al. |
| 5,703,368 A | 12/1997 | Tomooka et al. |
| 5,712,622 A | 1/1998 | Grossinger et al. |
| 5,757,270 A | 5/1998 | Mori |
| 5,834,765 A | 11/1998 | Ashdown |
| 5,844,240 A | 12/1998 | Lee et al. |
| 5,929,445 A | 7/1999 | Barone |
| 5,942,976 A | 8/1999 | Weiser et al. |
| 5,963,131 A | 10/1999 | D'Angelo et al. |
| 6,031,456 A | 2/2000 | Hanyuda |
| 6,078,253 A | 6/2000 | Fowler |
| 6,150,658 A | 11/2000 | Hagiwara |
| 6,163,025 A | 12/2000 | Pantus |
| 6,211,522 B1 | 4/2001 | Kotlicki et al. |
| 6,215,399 B1 | 4/2001 | Shpater |
| 6,222,191 B1 | 4/2001 | Myron et al. |
| 6,239,437 B1 | 5/2001 | Barone |
| 6,262,661 B1 | 7/2001 | Mahler et al. |
| 6,324,008 B1 | 11/2001 | Baldwin et al. |
| 6,377,174 B1 | 4/2002 | Siegwart et al. |
| 6,415,205 B1 | 7/2002 | Myron et al. |
| 6,469,625 B1 | 10/2002 | Tomooka |
| 6,529,129 B1 | 3/2003 | Tomooka |
| 6,653,635 B2 | 11/2003 | Liao et al. |
| 6,690,018 B1 | 2/2004 | Barone |
| 6,756,595 B2 | 6/2004 | Barone |
| 6,818,881 B1 | 11/2004 | Chernihovski et al. |
| 6,822,788 B2 | 11/2004 | Blitstein |
| 7,008,063 B2 | 3/2006 | Porter et al. |
| 7,053,374 B2 | 5/2006 | Barone |
| 7,075,431 B2 | 7/2006 | Buckley et al. |
| 7,115,871 B1 | 10/2006 | Tracy et al. |
| 2003/0156027 A1 | 8/2003 | Seo |
| 2004/0200955 A1 | 10/2004 | Andzelevich |
| 2005/0030180 A1 | 2/2005 | Pantus et al. |
| 2005/0045826 A1 | 3/2005 | Barone |
| 2005/0236572 A1 | 10/2005 | Micko |

FOREIGN PATENT DOCUMENTS

| | | |
|---|---|---|
| EP | 0499177 | 8/1992 |
| JP | 408240482 | 9/1996 |
| WO | WO 2007090458 A1 * | 8/2007 |

OTHER PUBLICATIONS

An Office Action dated Sep. 2, 2010, which issued during the prosecution of Applicant's U.S. Appl. No. 12/374,084.

* cited by examiner

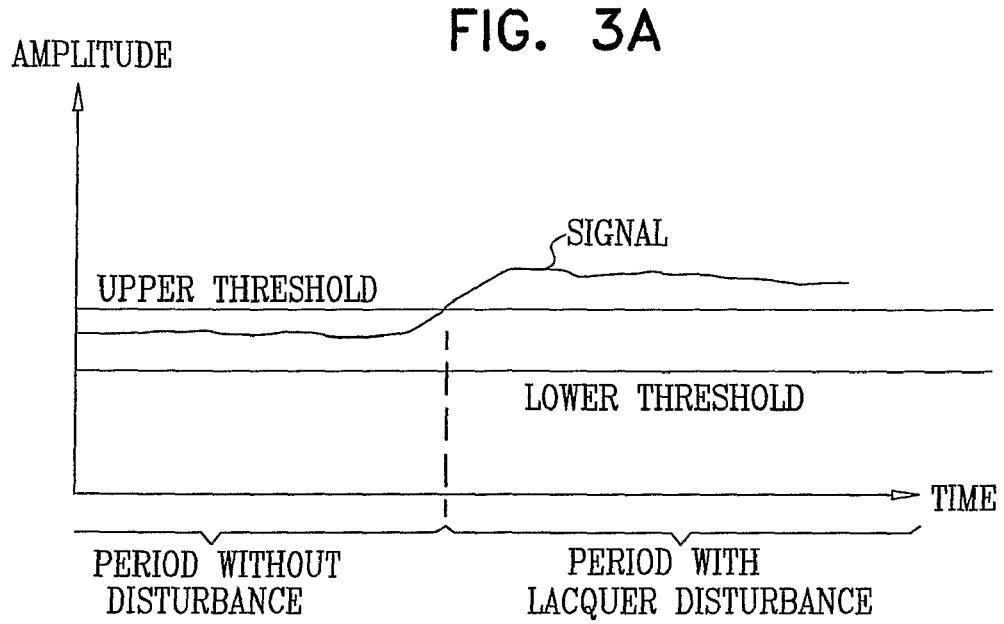
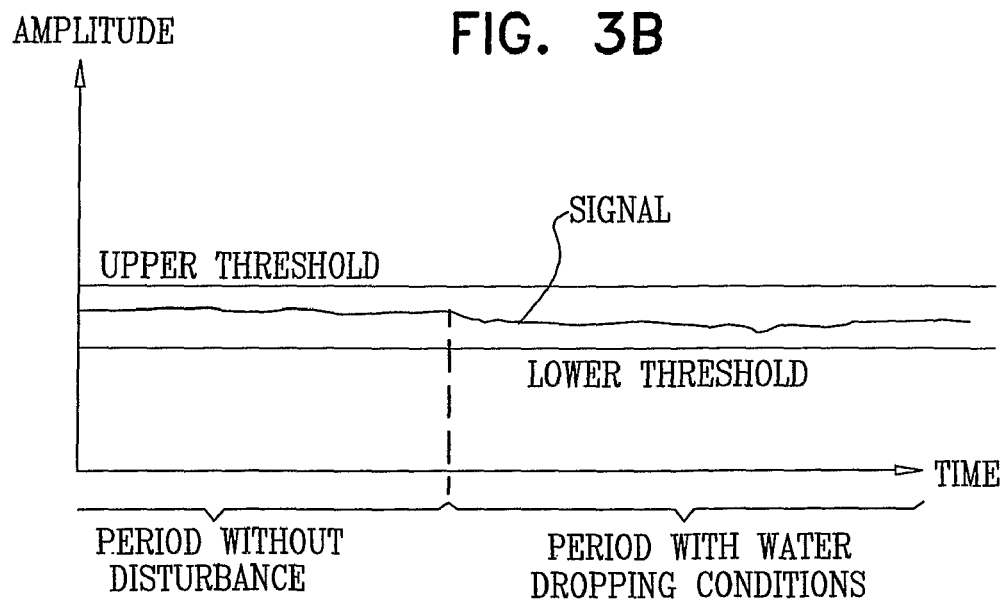

US 7,875,852 B2

PASSIVE INFRARED DETECTORS

REFERENCE TO RELATED APPLICATIONS

Reference is hereby made to U.S. Provisional Patent Application Ser. No. 60/834,367, filed Jul. 27, 2006, entitled PASSIVE INFRARED DETECTORS, the contents of which is hereby incorporated by reference and priority of which is hereby claimed pursuant to 37 CFR 1.78(a) (4) and (5)(i).

FIELD OF THE INVENTION

The present invention relates to passive infrared detectors generally and more particularly to detectors comprising sabotage detecting means known also as "anti-masking" detection means.

BACKGROUND OF THE INVENTION

The present invention relates to passive infrared motion detectors used for detection of motion of human targets moving in a spatial region monitored by the detector, by sensing far infrared radiation emanating from the targets. The detectors consist of a housing element, including a window which is transparent to far infrared radiation, and contain an optical system, such as a reflective mirror device or lens, which directs and focuses the infrared radiation from one or more detection fields-of-view or zones thereof onto one or more infrared radiation sensors, located within the housing.

The window typically is formed of infrared transparent materials such as HDPE and is operative to prevent insects and other spurious matter from entering the detector.

A person moving through the field-of-view of the detector emits far infrared radiation having wavelengths in the range of 5-14 μm, which radiation enters through the window into the detector and is focused by the optical system onto the infrared radiation sensor, thereby causing a signal output from the sensor. Signal processing circuitry of the detector detects and processes these signals and activates an alarm signal output when certain criteria are met.

One of the problems associated with the use of such detectors is that it is possible for a potential intruder to render a detector inoperative by masking its window, such as by spraying the window with a paint or lacquer that is opaque to far infrared radiation while being visually transparent, which makes the masking virtually invisible.

Various solutions for detecting such masking attempts are known in the art, particularly for detectors operating in indoor environments. In indoor detectors, when the window is sprayed with a paint or lacquer, special anti-masking circuitry activates a masking alarm. However, when detectors are installed outdoors, the anti-masking detecting circuitry may be fooled by water, such as rain, dew or irrigation water, wetting the window and activating the masking alarm.

The object of the present invention is to provide an anti-masking detector which can distinguish between masking attempts using painting or lacquer and water, thereby providing a masking alarm only when the window is masked with paint or lacquer and not providing a masking alarm when the window is wetted with water.

The following published patent documents and other publications are believed to represent the current state of the art:

U.S. Pat. Nos. 4,752,768; 4,242,669; 4,709,153; 4,982,094; 5,942,976; 6,031,456; 6,262,661; 6,377,174; 6,469,625 and 6,529,129; and European Patent Application Publication Nos.: EP0499177A1 and EP0481934A1.

SUMMARY OF THE INVENTION

The present invention relates to passive infrared detectors generally, and more specifically to passive infrared detectors having anti-masking mechanisms.

There is thus provided in accordance with a preferred embodiment of the present invention a passive infrared detector assembly including a detector housing including a window transparent to far infrared radiation, at least one sensor sensitive to the far infrared radiation and disposed within the detector housing and an anti-masking subassembly, including at least one light guide having at least one serrated light aperture, the light aperture defining a plurality of teeth like portions and a plurality of grooves and being disposed close to the outside of the window, at least one infrared light emitter operative to emit near infrared radiation via the light aperture of the at least one light guide and a near infrared radiation receiver operative to receive radiation emitted by the at least one near infrared light emitter and to measure the level of received near infrared radiation and to provide a masking alarm signal upon detection of a predetermined change in the level of the received near infrared radiation, wherein masking agents accumulating in the plurality of grooves change the level of the received near infrared radiation by a degree which exceeds a predetermined alarm threshold thereby causing the provision of a masking alarm signal, and wherein water accumulating in the plurality of grooves change the level of the received-near infrared radiation by a degree which does not exceed the predetermined alarm threshold thereby not causing the provision of a masking alarm signal.

In accordance with a preferred embodiment of the present invention the at least one sensor is a pyroelectric sensor. Preferably, the at least one sensor is sensitive to radiation having wavelengths in the range of 5-14 μm. Additionally, the at least one infrared light emitter is Operative to emit radiation having wavelengths in the range of 0.7-1 μm.

In accordance with another preferred embodiment of the present invention the infrared radiation receiver is operative to receive radiation reflected back from the near vicinity of the passive infrared detector. Preferably, the near infrared radiation receiver is located within the detector housing.

In accordance with yet another preferred embodiment of the present invention, the at least one infrared light emitter is located within the detector housing. Preferably, at least one of pitch, height, curvature and finish of the plurality of teeth like portions is configured to cause the near infrared radiation receiver to differentiate between different liquids.

There is also provided in accordance with another preferred embodiment of the present invention a method for detecting masking of a passive infrared detector, the method including providing a detector housing including a window transparent to far infrared radiation, disposing within the detector housing at least one sensor sensitive to the far infrared radiation and providing an anti-masking subassembly, including at least one light guide having at least one serrated light aperture, the light aperture defining a plurality of teeth like portions and a plurality of grooves and being disposed close to the outside of the window, at least one infrared light emitter operative to emit near infrared radiation via the light aperture of the at least one light guide and a near infrared radiation receiver operative to receive radiation emitted by the at least one near infrared light emitter and to measure the level of received near infrared radiation and to provide a masking alarm signal upon detection of a predetermined change in the level of the received near infrared radiation, wherein masking agents accumulating in the plurality of grooves change the level of the received near infrared radiation by a degree which exceeds a predetermined alarm threshold thereby causing the provision of a masking alarm signal, and wherein water accumulating in the plurality of grooves change the level of the received near infrared radiation by a degree which does not exceed the predetermined alarm threshold thereby not causing the provision of a masking alarm signal.

In accordance with a preferred embodiment of the present invention the disposing at least one sensor includes disposing a pyroelectric sensor within the housing. Preferably, the disposing at least one sensor includes disposing at least one sensor which is sensitive to radiation having wavelengths in the range of 5-14 µm. Additionally, the at least one infrared light emitter is operative to emit radiation having wavelengths in the range of 0.7-1 µm.

In accordance with another preferred embodiment of the present invention the infrared radiation receiver is operative to receive radiation reflected back from the near vicinity of the passive infrared detector. Preferably, the near infrared radiation receiver is located within the detector housing.

In accordance with yet another preferred embodiment of the present invention at least one infrared light emitter is located within the detector housing. Preferably, the method also includes configuring at least one of pitch, height, curvature and finish of the plurality of teeth like portions to cause the near infrared radiation receiver to differentiate between different liquids.

BRIEF DESCRIPTION OF THE DRAWINGS

The present invention will be understood and appreciated more fully from the following detailed description, taken in conjunction with the drawings in which:

FIGS. 3A and 3B are simplified diagrams illustrating the change in the extent of radiation received by the radiation receiver of FIG. 1 in the situations illustrated in FIGS. 2A and 2B, respectively.

DETAILED DESCRIPTION OF PREFERRED EMBODIMENTS

Figure 1:
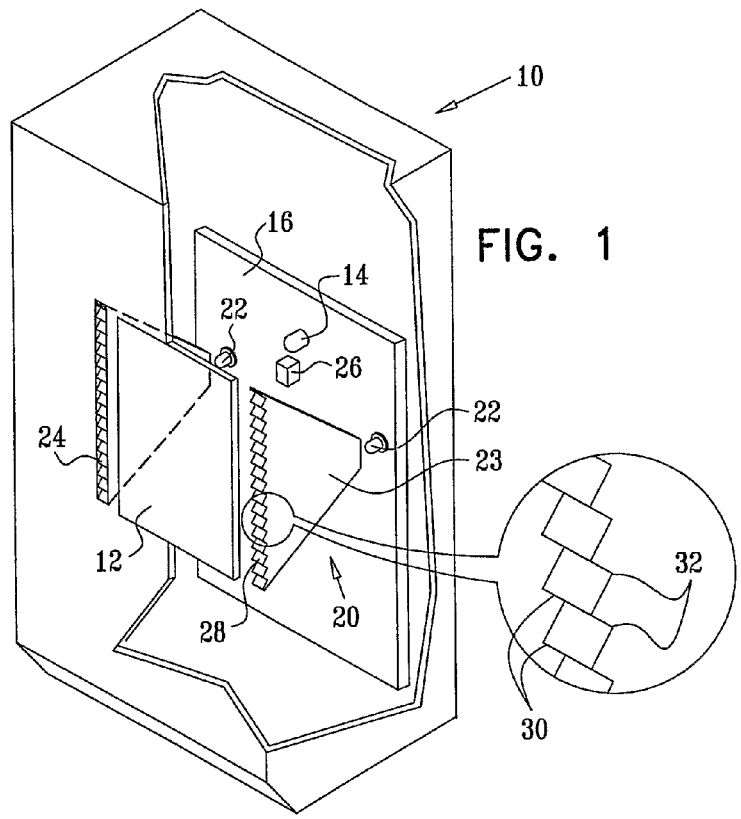
FIG. 1 is a simplified pictorial, partially cut-away illustration of a passive infrared detector assembly constructed in accordance with a preferred embodiment of the present invention.
Figure 2A:
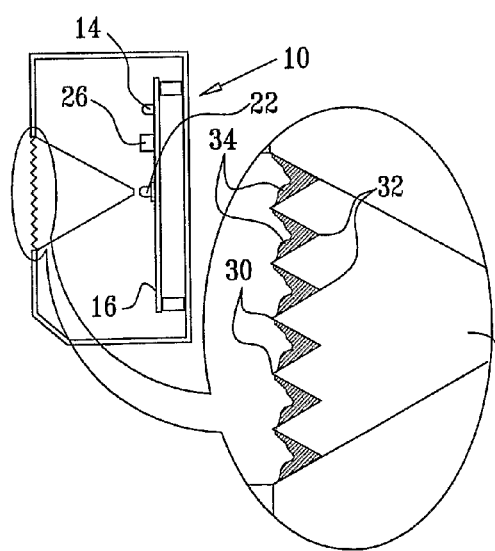
FIGS. 2A and 2B are simplified side view illustrations of the detector of FIG. 1 when masked with lacquer and wetted with water, respectively.
Figure 2B:
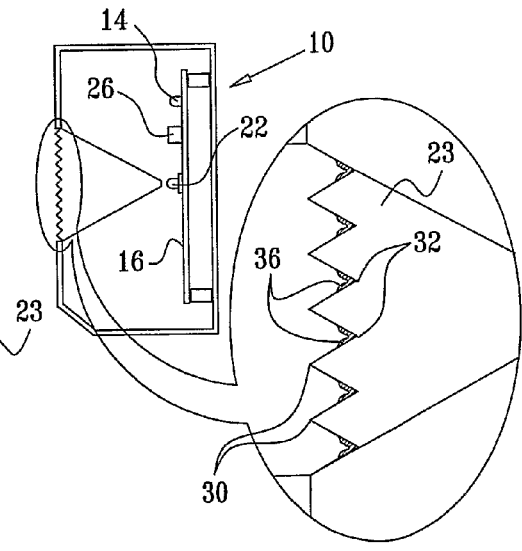

Reference is now made to FIG. 1, which is a simplified pictorial, partially cut-away illustration of a passive infrared detector assembly constructed in accordance with a preferred embodiment of the present invention, to FIGS. 2A and 2B, which are simplified side view illustrations of the detector of FIG. 1 when masked with lacquer and wetted with water respectively, and to FIGS. 3A and 3B, which are simplified diagrams illustrating the change in the extent of radiation received by the radiation receiver of FIG. 1 in the situations illustrated in FIGS. 2A and 2B respectively.

As seen in FIGS. 1-3B, a detector assembly 10 includes a window 12 and at least one sensor 14, which is preferably a pyroelectric sensor, sensitive to far infrared radiation having wavelengths of 5-14 µm, placed on a printed circuit board 16. The detector includes an anti-masking mechanism, configured to detect various attempts to obscure the field of view of the sensor 14 or mask the window 12, in particular when the detector is used in outdoor applications.

It is a particular feature of the present invention that the anti-masking mechanism illustrated in FIGS. 1-3B is operative to provide an alarm indication when someone attempts to mask the window 12, such as by spraying of paint or lacquer thereon, and not to provide an alarm indication when the window is made wet by water, such as rain water, irrigation water or dew, especially when the detector is installed outdoors.

An anti-masking assembly 20 preferably comprises one or more light emitters 22, preferably in a form of LEDs, which are operative to emit radiation, preferably in the near infrared range, having wavelengths between 0.7-1 µm, onto the window 12 and at the vicinity of the detector, via one or more light guides 23 having light apertures 24 located adjacent the window 12. A near infrared receiver 26, comprising processing circuitry (not shown), which is preferably mounted onto printed circuit board 16, receives infrared radiation emitted by light emitters 22 via the light apertures 24, as well as near infrared radiation reflected back from the near vicinity of the detector through window 12, and measures the level of the received infrared radiation.

Preferably, each of the light apertures 24 of light guides 23 include an outwardly facing serrated surface 28 defining a plurality of teeth-like portions 30. In accordance with a preferred embodiment of the present invention, the pitch, height, curvature or finish of the teeth-like portions 30 is configured to differentiate between various liquids, having different viscosity or different surface tension, which may be disposed on the window 12, which typically accumulate to some degree in grooves 32 defined between teeth-like portions 30.

As seen with particular clarity in FIGS. 2A and 3A, when a masking agent, such as a lacquer, which has a relatively high surface tension, is disposed onto window 12, a relatively large quantity of liquid accumulates in the grooves 32 as indicated by reference numeral 34, thereby changing the amount of the near IR radiation received by near infrared receiver 26 to an extent which falls outside the range of predetermined upper and lower alarm boundary levels, indicated in FIG. 3A as upper threshold and lower threshold, which indicates masking of window 12, and as a result, a masking alarm signal is provided.

Turning to FIGS. 2B and 3B, it is seen that when rain, irrigation water, dew or other humidity, which has a relatively low surface tension, is disposed onto window 12, the liquid accumulates in grooves 32, as indicated by reference numeral 36, to a lesser degree than masking lacquer accumulates, as indicated in FIG. 2A at reference numeral 34, thereby changing the amount of the near infrared radiation received by near infrared receiver 26 to an extent which does not fall outside the range of the predetermined upper and lower alarm boundary levels, indicated in FIG. 3B as upper threshold and lower threshold, thereby allowing the near infrared receiver 26 and the processing circuitry associated therewith to differentiate between masking agents having high surface tension and water, which has lower surface tension, and not to provide an alarm when the detector is exposed to water, such as rain, irrigation water, dew or other humidity.

It will be appreciated by persons skilled in the art that the present invention is not limited to what has been particularly shown and described hereinabove. Rather the scope of the present invention includes both combinations and subcombinations of the various features described hereinabove as well as modifications and variations thereof as would occur to a person of skill in the art upon reading the foregoing specification and which are not in the prior art.

The invention claimed is:

1. A passive infrared detector assembly comprising:
   a detector housing comprising a window transparent to far infrared radiation;
   at least one sensor sensitive to said far infrared radiation and disposed within said detector housing; and
   an anti-masking subassembly, including:
      at least one light guide having at least one serrated light aperture, said light aperture defining a plurality of teeth like portions and a plurality of grooves and being disposed close to the outside of said window;
      at least one infrared light emitter operative to emit near infrared radiation, via said light aperture of said at least one light guide, outside of said at least one light guide; and
      a near infrared radiation receiver operative to receive said near infrared radiation emitted by said at least one near infrared light emitter via said light aperture and to measure the level of received near infrared radiation and to provide a masking alarm signal upon detection of a predetermined change in the level of said received near infrared radiation,
   wherein masking agents accumulating in said plurality of grooves change the level of said received near infrared radiation by a degree which exceeds a predetermined alarm threshold thereby causing the provision of a masking alarm signal, and
   wherein water accumulating in said plurality of grooves change the level of said received near infrared radiation by a degree which does not exceed said predetermined alarm threshold thereby not causing the provision of a masking alarm signal.

2. A passive infrared detector assembly according to claim 1 and wherein said at least one sensor is a pyroelectric sensor.

3. A passive infrared detector assembly according to claim 1 and wherein said at least one sensor is sensitive to radiation having wavelengths in the range of 5-14 μm.

4. A passive infrared detector assembly according to claim 1 and wherein the at least one infrared light emitter is operative to emit radiation having wavelengths in the range of 0.7-1 μm.

5. A passive infrared detector assembly according to claim 1 and wherein said infrared radiation receiver is operative to receive radiation reflected back from the near vicinity of said passive infrared detector.

6. A passive infrared detector assembly according to claim 1 and wherein said near infrared radiation receiver is located within said detector housing.

7. A passive infrared detector assembly according to claim 1 and wherein said at least one infrared light emitter is located within said detector housing.

8. A passive infrared detector assembly according to claim 1 and wherein at least one of pitch, height, curvature and finish of said plurality of teeth like portions is configured to cause said near infrared radiation receiver to differentiate between different liquids.

9. A method for detecting masking of a passive infrared detector, the method comprising:
   providing a detector housing comprising a window transparent to far infrared radiation;
   disposing within said detector housing at least one sensor sensitive to said far infrared radiation; and
   providing an anti-masking subassembly, including:
      at least one light guide having at least one serrated light aperture, said light aperture defining a plurality of teeth like portions and a plurality of grooves and being disposed close to the outside of said window;
      at least one infrared light emitter operative to emit near infrared radiation, via said light aperture of said at least one light guide, outside of said at least one light guide; and
      a near infrared radiation receiver operative to receive said near infrared radiation emitted by said at least one near infrared light emitter via said light aperture and to measure the level of received near infrared radiation and to provide a masking alarm signal upon detection of a predetermined change in the level of said received near infrared radiation,
   wherein masking agents accumulating in said plurality of grooves change the level of said received near infrared radiation by a degree which exceeds a predetermined alarm threshold thereby causing the provision of a masking alarm signal, and
   wherein water accumulating in said plurality of grooves change the level of said received near infrared radiation by a degree which does not exceed said predetermined alarm threshold thereby not causing the provision of a masking alarm signal.

10. A method according to claim 9 and wherein said disposing at least one sensor comprises disposing a pyroelectric sensor within said housing.

11. A method according to claim 9 and wherein said disposing at least one sensor comprises disposing at least one sensor which is sensitive to radiation having wavelengths in the range of 5-14 μm.

12. A method according to claim 9 and wherein the at least one infrared light emitter is operative to emit radiation having wavelengths in the range of 0.7-1 μm.

13. A method according to claim 9 and wherein said infrared radiation receiver is operative to receive radiation reflected back from the near vicinity of said passive infrared detector.

14. A method according to claim 9 and wherein said near infrared radiation receiver is located within said detector housing.

15. A method according to claim 9 and wherein said at least one infrared light emitter is located within said detector housing.

16. A method according to claim 9 and also comprising configuring at least one of pitch, height, curvature and finish of said plurality of teeth like portions to cause said near infrared radiation receiver to differentiate between different liquids.

* * * * *